(12) United States Patent
Matrose

(10) Patent No.: US 12,552,310 B1
(45) Date of Patent: Feb. 17, 2026

(54) MULTI-POSITION TURN SIGNAL SYSTEM FOR VEHICLES

(71) Applicant: Julia A. Matrose, Westminster, CO (US)

(72) Inventor: Julia A. Matrose, Westminster, CO (US)

(*) Notice: Subject to any disclaimer, the term of this patent is extended or adjusted under 35 U.S.C. 154(b) by 0 days.

(21) Appl. No.: 19/286,362

(22) Filed: Jul. 31, 2025

(51) Int. Cl.
*B60Q 1/34* (2006.01)
*B60Q 1/00* (2006.01)
*B60Q 1/38* (2006.01)
*B60Q 1/52* (2006.01)
*B60Q 5/00* (2006.01)
*B60Q 9/00* (2006.01)

(52) U.S. Cl.
CPC ........... *B60Q 1/343* (2013.01); *B60Q 1/0023* (2013.01); *B60Q 1/0041* (2013.01); *B60Q 1/346* (2013.01); *B60Q 1/381* (2022.05); *B60Q 1/52* (2013.01); *B60Q 5/001* (2013.01); *B60Q 9/00* (2013.01); *B60Q 2900/40* (2022.05)

(58) Field of Classification Search
CPC .... B60Q 1/343; B60Q 1/0023; B60Q 1/0041; B60Q 1/346; B60Q 1/381; B60Q 1/52; B60Q 5/001; B60Q 9/00; B60Q 2900/40
See application file for complete search history.

(56) References Cited

U.S. PATENT DOCUMENTS

| | | | |
|---|---|---|---|
| 3,576,530 A | 4/1971 | Buechler et al. | |
| 4,123,632 A | 10/1978 | Muto | |
| 4,684,918 A | 8/1987 | Solomon | |
| 5,739,491 A | 4/1998 | Crosson, Jr. | |
| 5,823,666 A | 10/1998 | Kingsolver | |
| 6,034,600 A | 3/2000 | Browne et al. | |
| 7,589,623 B2 | 9/2009 | Oyaide | |

(Continued)

FOREIGN PATENT DOCUMENTS

| | | |
|---|---|---|
| EP | 0227607 A2 | 7/1987 |
| EP | 2883747 B1 | 6/2015 |

(Continued)

OTHER PUBLICATIONS

49 CFR Section 571.108 Standard No. 108; Lamps, reflective devices, and associated equipment, Title 49—Transportation, Subtitle B—Other Regulations Relating to Transportation, Chapter V—National Highway Traffic Safety Administration, Department of Transportation Part 571—Federal Motor Vehicle Safety Standards, Subpart B—Federal Motor Vehicle Safety Standards, (1971), vol. 36 FR 22902, National Highway Traffic Safety Administration, Department of Transportation. Retrieved Jul. 14, 2025 from https://www.ecfr.gov/current/title-49/subtitle-B/chapter-V/.

*Primary Examiner* — Daryl C Pope
(74) *Attorney, Agent, or Firm* — Stephen B. Katsaros; Patent Engineering, LLC

(57) ABSTRACT

A multi-position turn signal system for vehicles includes a turn signal lever movable between a neutral-position, primary-positions, and secondary-positions. The primary-positions activate standard turn signals, while the secondary-positions indicate multi-lane changes. In some configurations, the system may incorporate electronic integration with vehicle sensors, auxiliary indicators, or variable duration signaling. The system enhances communication of driver intent during complex lane change maneuvers, improving safety in multi-lane traffic scenarios.

12 Claims, 7 Drawing Sheets

(56) References Cited

U.S. PATENT DOCUMENTS

| | | |
|---|---|---|
| 7,876,210 B2 | 1/2011 | Tsukida et al. |
| 8,519,840 B1 | 8/2013 | Banks |
| 9,208,975 B2 | 12/2015 | Mizuno et al. |
| 9,809,156 B2 | 11/2017 | Lee |
| 10,829,037 B2 | 11/2020 | Gibson et al. |
| 11,001,207 B2 | 5/2021 | Sakai et al. |
| 2003/0016127 A1 | 1/2003 | Imawaki |
| 2006/0044129 A1 | 3/2006 | Patel |
| 2009/0045935 A1 | 2/2009 | Tsukida et al. |
| 2014/0091920 A1 | 4/2014 | Thompson |
| 2015/0075954 A1 | 3/2015 | Mizuno et al. |
| 2017/0166112 A1 | 6/2017 | Lee |
| 2021/0228995 A1 | 7/2021 | Spillman et al. |
| 2022/0250537 A1* | 8/2022 | Balogun ................ B60Q 1/38 |

FOREIGN PATENT DOCUMENTS

| | | |
|---|---|---|
| JP | S6154333 A | 3/1986 |
| WO | 9826952 A1 | 6/1998 |

* cited by examiner

MULTI-POSITION TURN SIGNAL SYSTEM FOR VEHICLES

TECHNICAL FIELD

The present disclosure relates to vehicle turn signal systems. Conventional turn signals typically indicate only basic left or right turns.

BACKGROUND

Vehicle turn signal systems have been an essential safety feature on motor vehicles for many decades. As outlined in 49 CFR 571.108, titled "Federal Motor Vehicle Safety Standard No. 108; Lamps, reflective devices, and associated equipment," turn signal lamps are required equipment on passenger cars, multipurpose passenger vehicles, trucks, buses, trailers, and motorcycles. The regulation specifies detailed requirements for turn signal lamp performance, including minimum photometric intensity values, color specifications, and activation parameters.

Traditionally, turn signal systems have utilized a simple lever mechanism with a neutral-position and two indicator-positions—left and right—to activate the corresponding turn signal lamps. This basic functionality has remained largely unchanged since the widespread adoption of turn signals. The standard turn signal control allows drivers to indicate their intention to turn or change lanes in either direction.

While effective for basic maneuvers, conventional turn signal systems may have limitations in more complex traffic scenarios. For example, when navigating multi-lane highways or executing lane changes across multiple lanes, the binary left/right signal may not fully convey a driver's intended path. Additionally, in situations like roundabouts or complicated intersections, more nuanced directional indicators could potentially provide other drivers with clearer information about a vehicle's projected trajectory.

The automotive industry has seen advancements in many vehicle systems and controls over the years, but turn signal functionality has remained relatively static. As vehicle technology continues to evolve, particularly with the development of advanced driver assistance systems and progress toward autonomous vehicles, there may be opportunities to enhance the capabilities of turn signal systems to provide more detailed directional information.

Some modern vehicles have implemented automatic turn signal cancellation features that deactivate the signal after a full turn is completed—usually a ninety degree change of direction. However, the core turn signal activation mechanism and the information it conveys have not significantly changed. As traffic patterns become more complex and roads more congested, there may be benefits to expanding the communicative abilities of vehicle turn signals.

SUMMARY

The present disclosure addresses the growing need for enhanced communication between drivers during complex lane change maneuvers, particularly on multi-lane highways and expressways. With the increasing prevalence of multi-lane roadways and the frequency of drivers needing to traverse multiple lanes quickly, traditional turn signal systems often fall short in clearly conveying driver intentions. This invention provides a more nuanced and informative signaling system that can significantly improve road safety and reduce driver uncertainty.

According to an aspect of the present disclosure, a turn signal system for a vehicle is provided. The system includes a turn signal lever movable between a neutral position and a plurality of signal positions, a control unit coupled to the turn signal lever, and at least one turn signal indicator controlled by the control unit. The plurality of signal positions comprises a first left signal position and a second left signal position for indicating leftward vehicle movement, and a first right signal position and a second right signal position for indicating rightward vehicle movement. The control unit is configured to activate the at least one turn signal indicator in a first pattern when the turn signal lever is moved to the first left signal position or the first right signal position, and activate the at least one turn signal indicator in a second pattern different from the first pattern when the turn signal lever is moved to the second left signal position or the second right signal position.

According to other aspects of the present disclosure, the turn signal system may include one or more of the following features. The first pattern may comprise a standard turn signal flash rate and the second pattern may comprise a faster flash rate than the standard turn signal flash rate. The control unit may be further configured to activate an audible indicator when the turn signal lever is moved to the second left signal position or the second right signal position. The at least one turn signal indicator may comprise a first set of turn signal lamps activated by the first pattern and a second set of turn signal lamps activated by the second pattern. The second set of turn signal lamps may comprise lamps integrated into side mirrors of the vehicle.

The turn signal system may further include a sensor configured to detect lane markings, wherein the control unit may be further configured to deactivate the at least one turn signal indicator upon detecting that the vehicle has changed lanes a number of times corresponding to the signal position of the turn signal lever. The control unit may be further configured to generate a feedback while the at least one turn signal indicator is activated in the second pattern, where the feedback may be at least one of: a haptic feedback, an audible feedback, and a visual feedback.

According to another aspect of the present disclosure, a method of operating a turn signal system for a vehicle is provided. The method includes moving a turn signal lever between a neutral position and a plurality of signal positions, wherein the plurality of signal positions comprises a first left signal position, a second left signal position, a first right signal position, and a second right signal position. The method further includes activating, by a control unit, at least one turn signal indicator in a first pattern when the turn signal lever is moved to the first left signal position or the first right signal position, and activating, by the control unit, the at least one turn signal indicator in a second pattern different from the first pattern when the turn signal lever is moved to the second left signal position or the second right signal position.

According to other aspects of the present disclosure, the method may include additional features. The first pattern may comprise a standard turn signal flash rate, the second pattern may comprise a faster flash rate than the standard turn signal flash rate, and the method may further comprise activating an audible indicator when the turn signal lever is moved to the second left signal position or the second right signal position. Activating the at least one turn signal indicator in the first pattern may comprise activating a first set of turn signal lamps, activating the at least one turn signal indicator in the second pattern may comprise activating a second set of turn signal lamps, and the second set of turn signal lamps may comprise lamps integrated into side mirrors of the vehicle. The method may further include detecting lane markings using a sensor, deactivating the at least one turn signal indicator upon detecting that the vehicle has changed lanes a number of times corresponding to the signal position of the turn signal lever, and generating a feedback while the at least one turn signal indicator is activated in the second pattern, wherein the feedback may be at least one of: a haptic feedback, an audible feedback, and a visual feedback.

According to yet another aspect of the present disclosure, a vehicle turn signal system is provided. The system includes a turn signal control mechanism, a plurality of light-emitting elements arranged in a chevron pattern on an exterior surface of the vehicle, and a control unit. The control unit is configured to receive an input from the turn signal control mechanism and activate the plurality of light-emitting elements in a sequential pattern to display a moving chevron indicator in response to the input.

According to a further aspect of the present disclosure, a method of operating a vehicle turn signal system is provided. The method includes detecting actuation of a turn signal control to a first position, activating a first set of exterior vehicle lights in a standard turn signal pattern, detecting further actuation of the turn signal control to a second position, and activating a second set of exterior vehicle lights in addition to the first set, wherein the second set of lights provides a visual indication of an intended multi-lane change maneuver.

According to an additional aspect of the present disclosure, a vehicle signaling system is provided. The system includes a turn signal lever movable between a neutral position and a plurality of actuated positions, a control unit coupled to the turn signal lever, and a display device visible to a vehicle operator. The control unit is configured to detect movement of the turn signal lever to one of the plurality of actuated positions, determine a number of lane changes indicated by the actuated position, and present, on the display device, a visual confirmation of the number of lane changes indicated.

According to another aspect of the present disclosure, a vehicle turn signal apparatus is provided. The apparatus includes a turn signal activation mechanism, a plurality of signal indicators positioned on an exterior of a vehicle, and a controller. The controller is configured to receive an input from the turn signal activation mechanism, determine whether the input indicates a single-lane change or a multi-lane change, and activate the plurality of signal indicators in a first pattern for a single-lane change or a second, distinct pattern for a multi-lane change.

According to an aspect of the present disclosure, a method of operating a vehicle turn signal is provided. The method includes detecting actuation of a turn signal control, determining a degree of actuation of the turn signal control, selecting a turn signal pattern from a plurality of pre-defined patterns based on the determined degree of actuation, and activating one or more vehicle exterior lights according to the selected turn signal pattern.

According to a final aspect of the present disclosure, a turn signal system for a vehicle may be provided with a sequence of flashes that represent information. While many schemes may be utilized, one illustrative sequence of flashes is the Morse Code wherein dots and dashes convey information, e.g., Save-Our-Soul (SOS) is represented by dot-dot-dot-dash-dash-dash-dot-dot-dot ( . . . - - - . . . ). Other sequences may be utilized such as the presence of intentionally slow-moving vehicle or request for mechanical help (e.g., changing a flat tire).

These various aspects and embodiments of the present disclosure provide a comprehensive and flexible turn signal system that can significantly enhance driver communication and road safety in modern multi-lane traffic scenarios.

Further areas of applicability of the present disclosure will become apparent from the detailed description provided hereinafter. It should be understood that the detailed description and specific examples while indicating various configurations, are intended for purposes of illustration only and are not intended to necessarily limit the scope of the disclosure.

BRIEF DESCRIPTION OF THE DRAWINGS

The accompanying figures of the drawing, which are included to provide a further understanding of general aspects of the system/method, are incorporated in and constitute a part of this specification. These illustrative aspects of the system/method, and together with the detailed description, explain the principles of the system. No attempt is made to show structural details in more detail than is necessary for a fundamental understanding of the system and the various ways in which it is practiced. The following figures of the drawing include.

Figure 1:
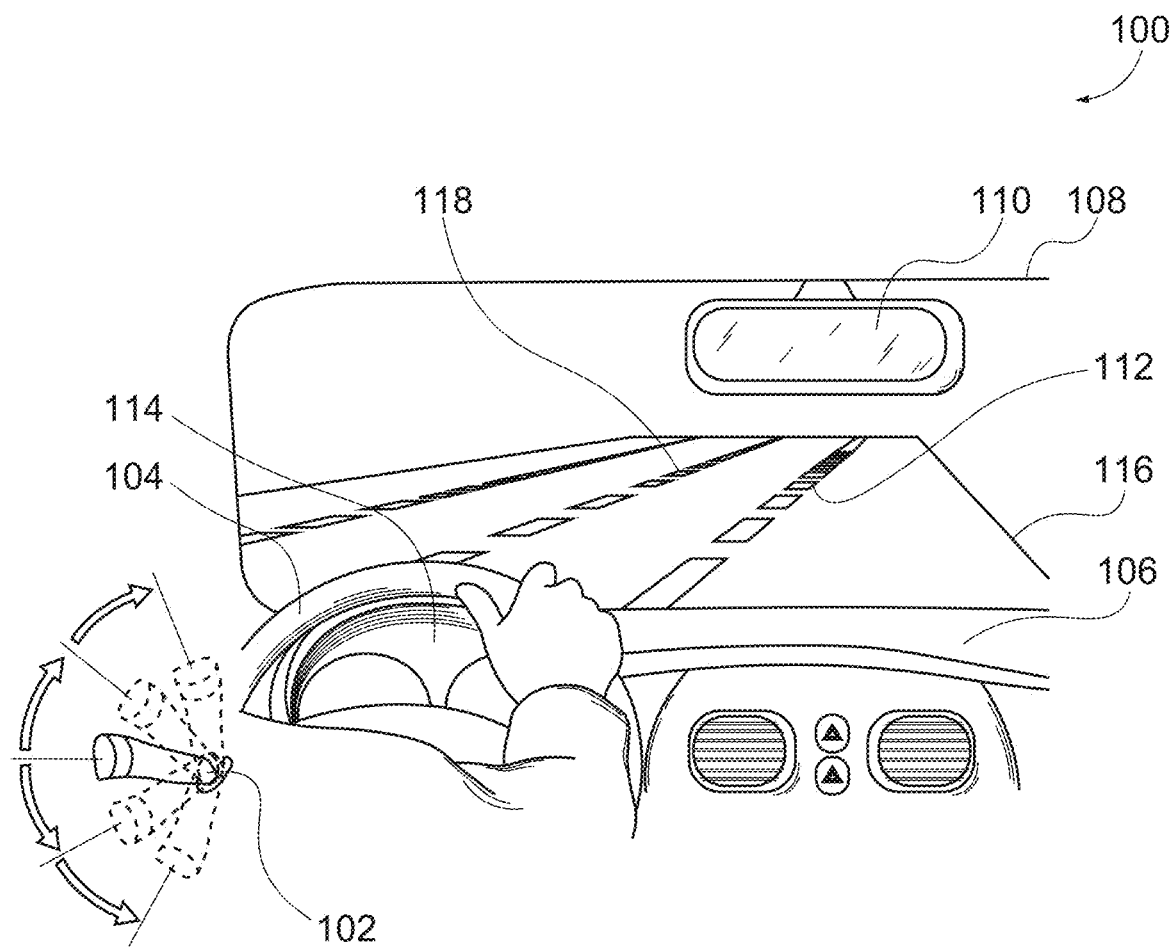
FIG. 1 illustrates a front view from a vehicle interior, showing the driver's perspective through the windshield and turn signal controls.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label. Where the reference label is used in the specification, the description is applicable to any one of the similar components having the same reference label.

DETAILED DESCRIPTION

Illustrative configurations are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed configurations. It is intended that the following detailed description be considered exemplary only, with the true scope and spirit being indicated by the following claims.

Conventional turn signal systems in vehicles lack the ability to clearly distinguish between standard lane changes and multi-lane maneuvers, posing significant safety risks during complex traffic scenarios on multi-lane highways and expressways. According to the National Highway Traffic Safety Administration (NHTSA), lane change maneuvers account for approximately 9% of all reported crashes in the United States, with nearly 15% of these accidents involving vehicles crossing multiple lanes in quick succession. The Federal Highway Administration (FHWA) reports that about 50% of traffic congestion on freeways is caused by lane-changing behavior, with multi-lane changes being a notable contributor to this issue. The danger is particularly evident when drivers attempt to navigate to exit ramps or make last-minute lane adjustments, underscoring the need for improved communication systems that can effectively convey a driver's intentions during complex lane change maneuvers.

To address these challenges, the present multi-position turn signal system for vehicles may enhance communication of driver intent during complex lane change maneuvers. The disclosed system includes a turn signal lever that can be moved between neutral position, primary positions, and secondary positions, where the primary positions activate standard turn signals, while the secondary positions indicate multi-lane changes. In some configurations, the system may incorporate electronic integration with vehicle sensors, auxiliary indicators, or variable duration signaling, providing drivers with a means to clearly communicate their intentions for both single and multiple lane changes. This enhanced communication may improve safety in multi-lane traffic scenarios by reducing confusion among nearby drivers and potentially decreasing the likelihood of accidents related to lane change maneuvers, while offering flexibility in signaling patterns and durations for more nuanced communication of driver intent in various traffic situations.

The multi-position turn signal system may be designed to work with existing vehicle infrastructure, potentially allowing for retrofitting in older vehicles or seamless integration into new vehicle designs, and may be adaptable to various types of vehicles, including passenger cars, commercial trucks, and specialized vehicles like municipal or government vehicles such as, for example, emergency medical service (EMS), firetrucks, police cars, school buses, where clear communication of lane change intentions can be particularly critical for safety. By providing a more comprehensive signaling system, the disclosed multi-position turn signal addresses the limitations of conventional turn signals and contributes to improved traffic flow and safety on multi-lane roadways. The system's ability to distinguish between single and multi-lane change intentions helps reduce the risks associated with complex lane change maneuvers, potentially leading to a decrease in lane change-related accidents and traffic congestion, particularly as traffic patterns become more complex and roads more congested.

FIG. 1 illustrates a multi-position turn signal system for a vehicle 100. The multi-position turn signal system includes a turn signal lever 102 extending from a steering wheel 104. A dashboard 106 is positioned in front of the steering wheel 104. The vehicle 100 includes a windshield 108 through which a multi-lane roadway 116 with lane lines 118 and road markings 112 may be visible. A rearview mirror 110 may be mounted near the top of the windshield 108. Instrument displays 114 may be integrated into the dashboard 106. The turn signal lever 102 may be movable between a neutral position and a plurality of signal positions. In some cases, the plurality of signal positions includes a first left signal position and a second left signal position for indicating leftward vehicle movement, as well as a first right signal position and a second right signal position for indicating rightward vehicle movement. The turn signal lever 102 may be coupled to a control unit. The control unit may be configured to activate at least one turn signal indicator in response to movement of the turn signal lever 102. In an illustrative configuration, the control unit may activate the at least one turn signal indicator in a first pattern when the turn signal lever 102 is moved to the first left signal position or the first right signal position. Additionally, the control unit may activate the at least one turn signal indicator in a second pattern, different from the first pattern, when the turn signal lever 102 is moved to the second left signal position or the second right signal position. The multi-position turn signal system may enhance communication of driver intent during both standard turns and multi-lane changes. For example, activation of the first pattern may indicate a standard turn or single-lane change, while activation of the second pattern may indicate a multi-lane change maneuver. This differentiation in signaling patterns may provide clearer information to surrounding drivers about the intended vehicle movements.

Figure 2:
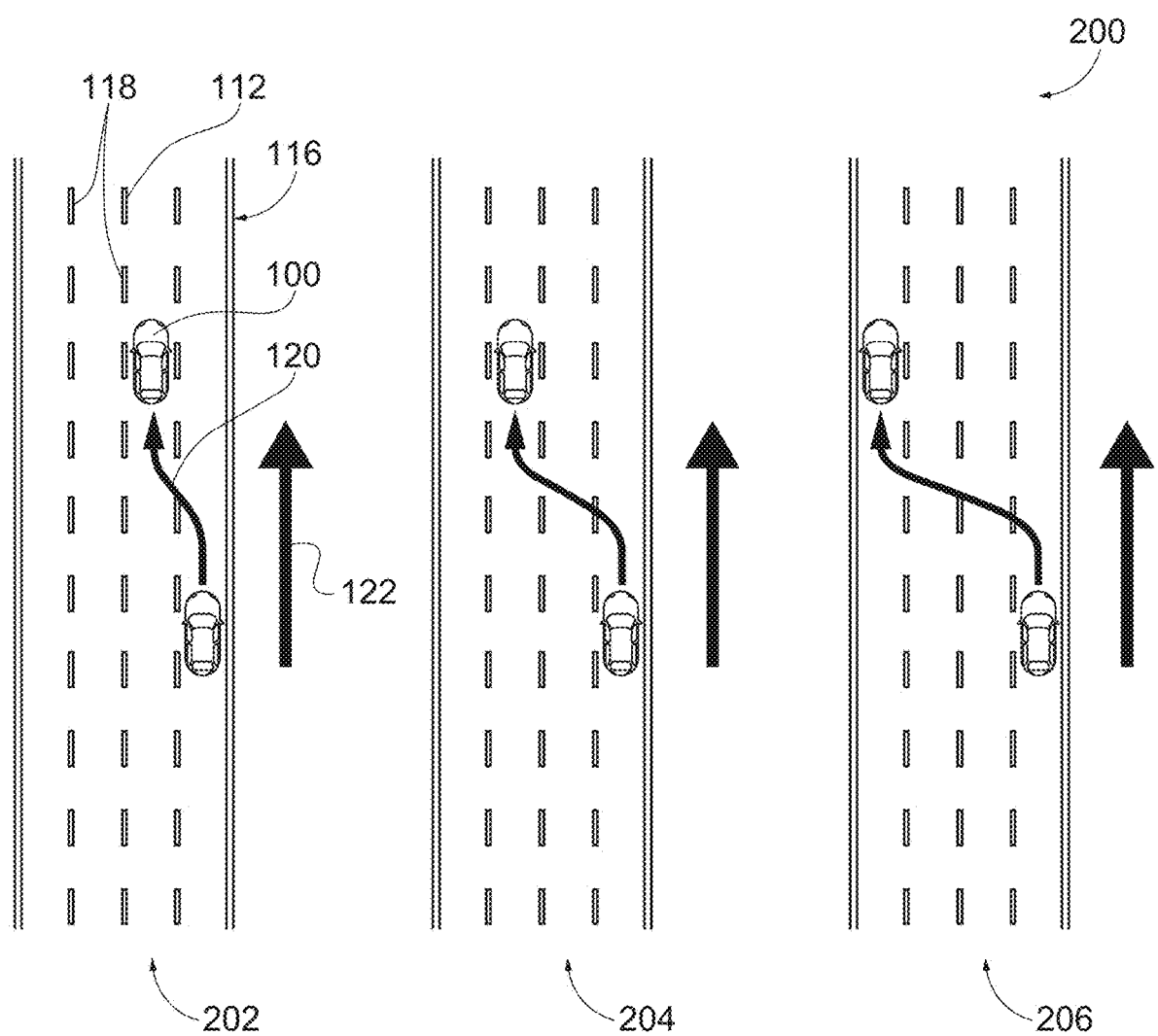
FIG. 2 illustrates a sequence of three different vehicle lane change scenarios viewed from above, demonstrating various lane change maneuvers.

FIG. 2 illustrates various lane change scenarios that a multi-position turn signal system can indicate. A vehicle 100 may navigate a multi-lane roadway 116 with lane lines 118 and road markings 112. The multi-position turn signal system may communicate different maneuvers to other drivers through distinct signaling patterns. In some cases, a control unit may detect movement of a turn signal lever to an actuated position and determine a number of lane changes indicated. For a single-lane change 202, the control unit may activate a first set of exterior vehicle lights in a standard turn signal pattern. The lane change path 120 shows the vehicle 100 moving from one lane to an adjacent lane. For a double-lane change 204, the control unit may activate a second set of exterior vehicle lights in addition to the first set, providing a visual indication of an intended multi-lane change maneuver. The lane change path 120 in this scenario depicts the vehicle 100 crossing two lanes. In cases of a triple-lane change 206, the control unit may activate the signal indicators in a second, distinct pattern for multi-lane changes. This pattern may be visually different from the single-lane change pattern, clearly communicating the driver's intention to perform a more complex maneuver. The traffic flow direction 122 indicates the overall movement of vehicles on the multi-lane roadway 116. The multi-position turn signal system may adapt its signaling based on the input received from the turn signal activation mechanism, with the controller determining if the input indicates a single-lane change or a multi-lane change. This adaptive signaling enhances communication between drivers, potentially improving safety during lane change maneuvers on multi-lane roadways.

Figure 3:
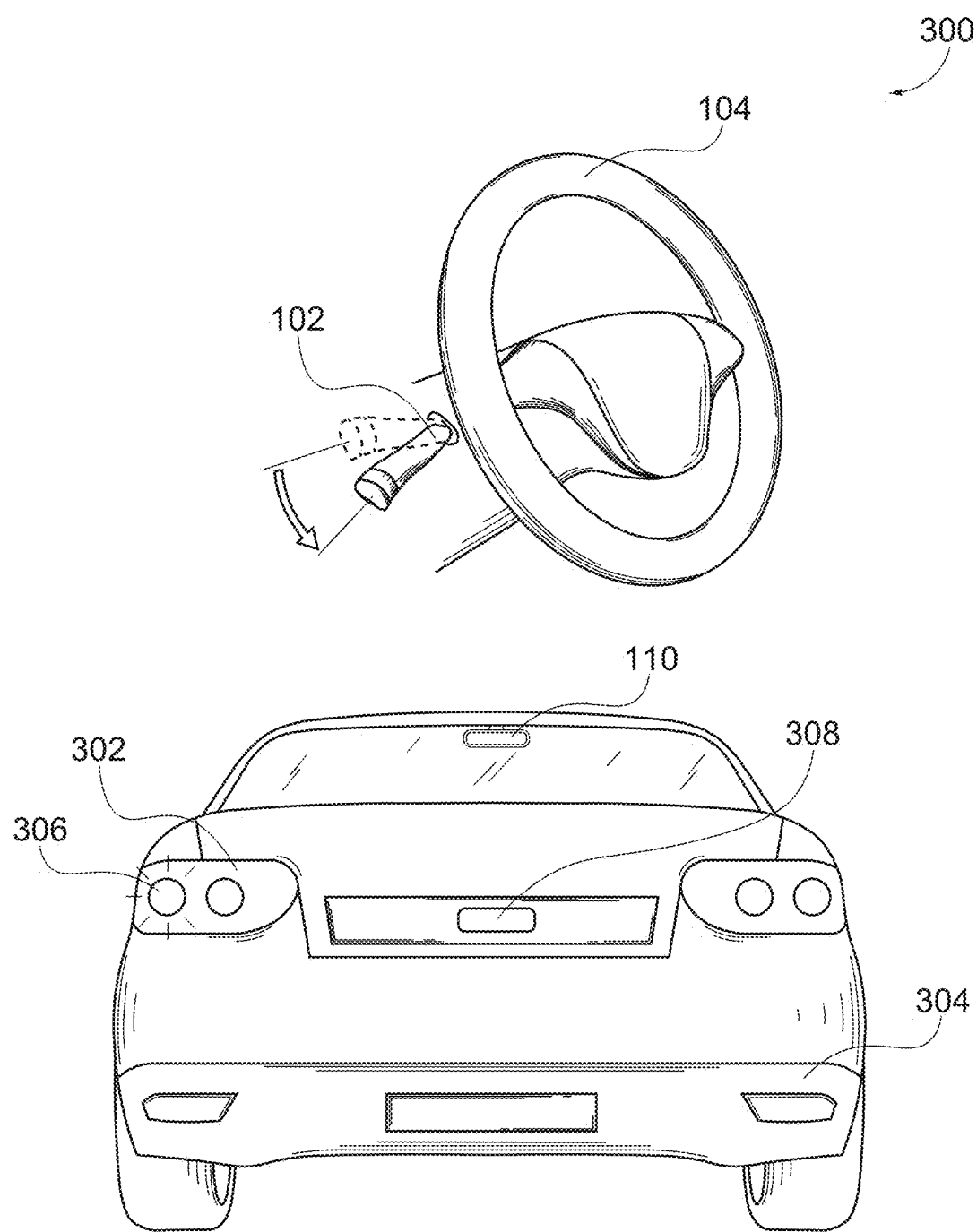
FIG. 3 illustrates a rear orthogonal view of a conventional vehicle and an associated steering wheel assembly.

FIG. 3 illustrates a conventional (i.e. prior art) vehicle 100 and associated turn signal system. A turn signal lever 102 extends from a steering wheel 104, allowing a driver to indicate intended directional changes. The turn signal lever 102 typically moves between three positions: a neutral center position, an upward position for signaling right turns, and a downward position for signaling left turns. When actuated, the turn signal lever 102 activates corresponding turn signal indicators 306 on the exterior of the vehicle 100.

The rear view of the vehicle 100 includes tail light assemblies 302 positioned on both sides of the vehicle 100. The tail light assemblies 302 incorporate turn signal indicators 306, which flash in a standard pattern when activated by the turn signal lever 102. A rear bumper 304 extends across the lower portion of the vehicle 100, and a license plate area 308 is typically centrally located between the tail light assemblies 302. A rearview mirror 110 may be mounted inside the vehicle 100 to provide the driver with a view of following traffic. In conventional turn signal systems, the standard flash pattern of the turn signal indicators 306 provides limited information to other drivers. When a driver intends to change multiple lanes, the turn signal indicators 306 continue to flash in the same pattern regardless of whether the driver plans to change one, two, three, or more lanes. This lack of differentiation in signaling can lead to confusion and potential safety hazards in multi-lane traffic scenarios, as overtaking vehicles may be unaware of the full extent of the signaling vehicle's intended maneuver. The conventional turn signal system's inability to communicate more complex lane change intentions highlights the need for modernization and improved driver-to-driver communication in contemporary traffic environments.

Figure 4:
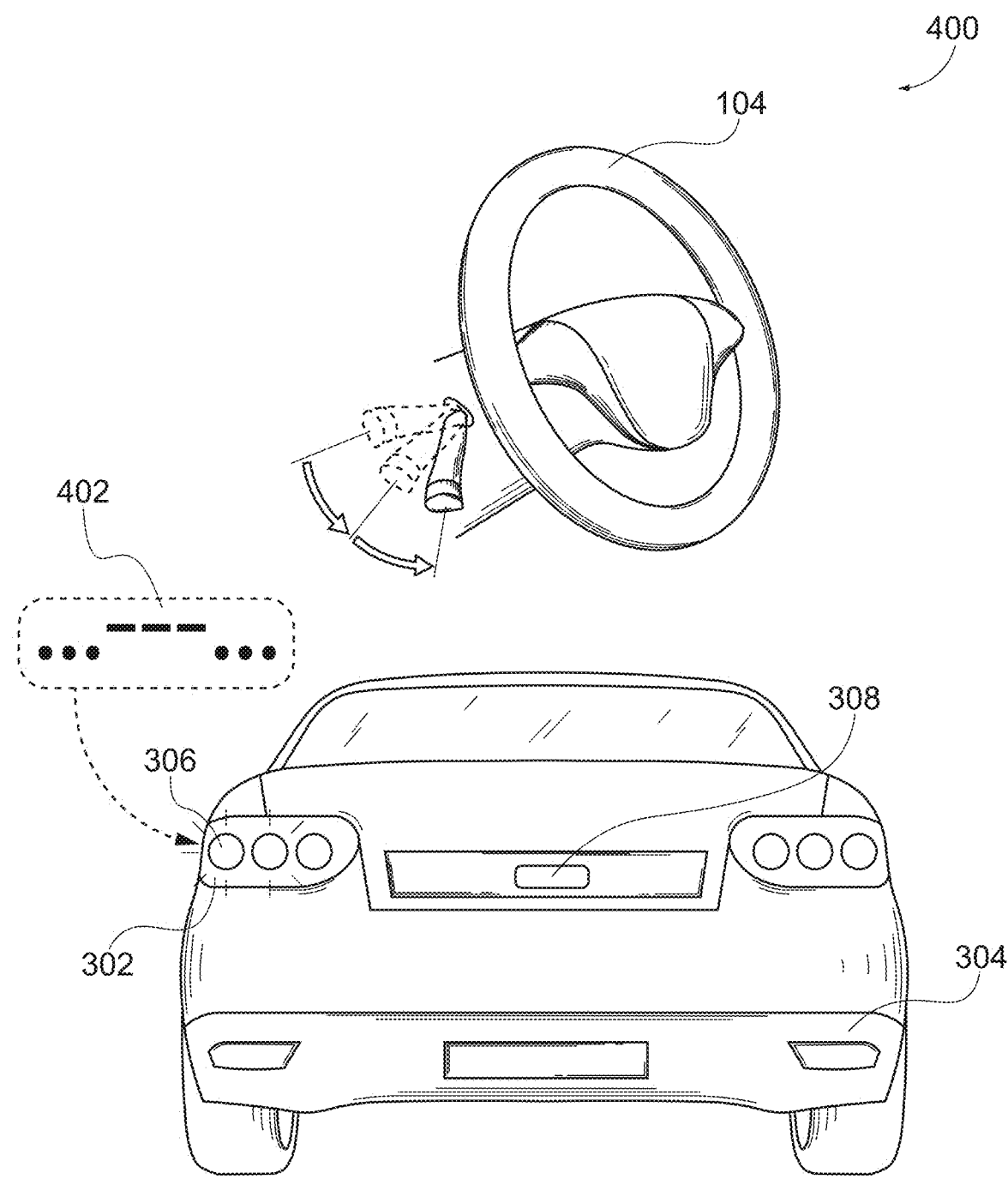
FIG. 4 illustrates a rear orthogonal view of a vehicle with a representation of a signal sequence emerging from the tail light assembly.

FIG. 4 illustrates a rear orthogonal view of a vehicle 100 with a representation of a signal sequence emerging from tail light assemblies 302. The vehicle 100 includes a rear bumper 304 extending across the lower portion of the rear fascia. The tail light assemblies 302 are positioned on both sides of the vehicle 100 and incorporate turn signal indicators 306. In some cases, the turn signal indicators 306 may include a plurality of light-emitting elements arranged as shown (or in an alternative chevron pattern, FIGS. 6 and 7) on the exterior surface of the vehicle 100. The turn signal indicators 306 may comprise a first set of turn signal lamps activated by a first pattern and a second set of turn signal lamps activated by a second pattern. In an illustrative configuration, the second pattern (illustrated as a Morse code, for example, such as SOS presented as dash-dot-dash) may comprise a different flash sequence such as a faster flash rate than a standard turn signal flash rate.

A control unit may be configured to receive an input from a turn signal control mechanism. The control unit may activate the plurality of light-emitting elements in a sequential pattern to display a moving chevron indicator in response to the input. This activation may result in an indicator pattern 402 emerging from the tail light assemblies 302, visually representing the driver's intent to change lanes. In some cases, the control unit may determine whether the input indicates a single-lane change or a multi-lane change, activating the plurality of signal indicators in a first pattern for a single-lane change or a second, distinct pattern for a multi-lane change. Additionally, the vehicle 100 may include headlights 508, a grille 506, and a front bumper 504 on its front fascia. In some configurations, a help request button 502 may be integrated into the vehicle's control system, allowing the driver to signal for assistance when needed.

Figure 5:
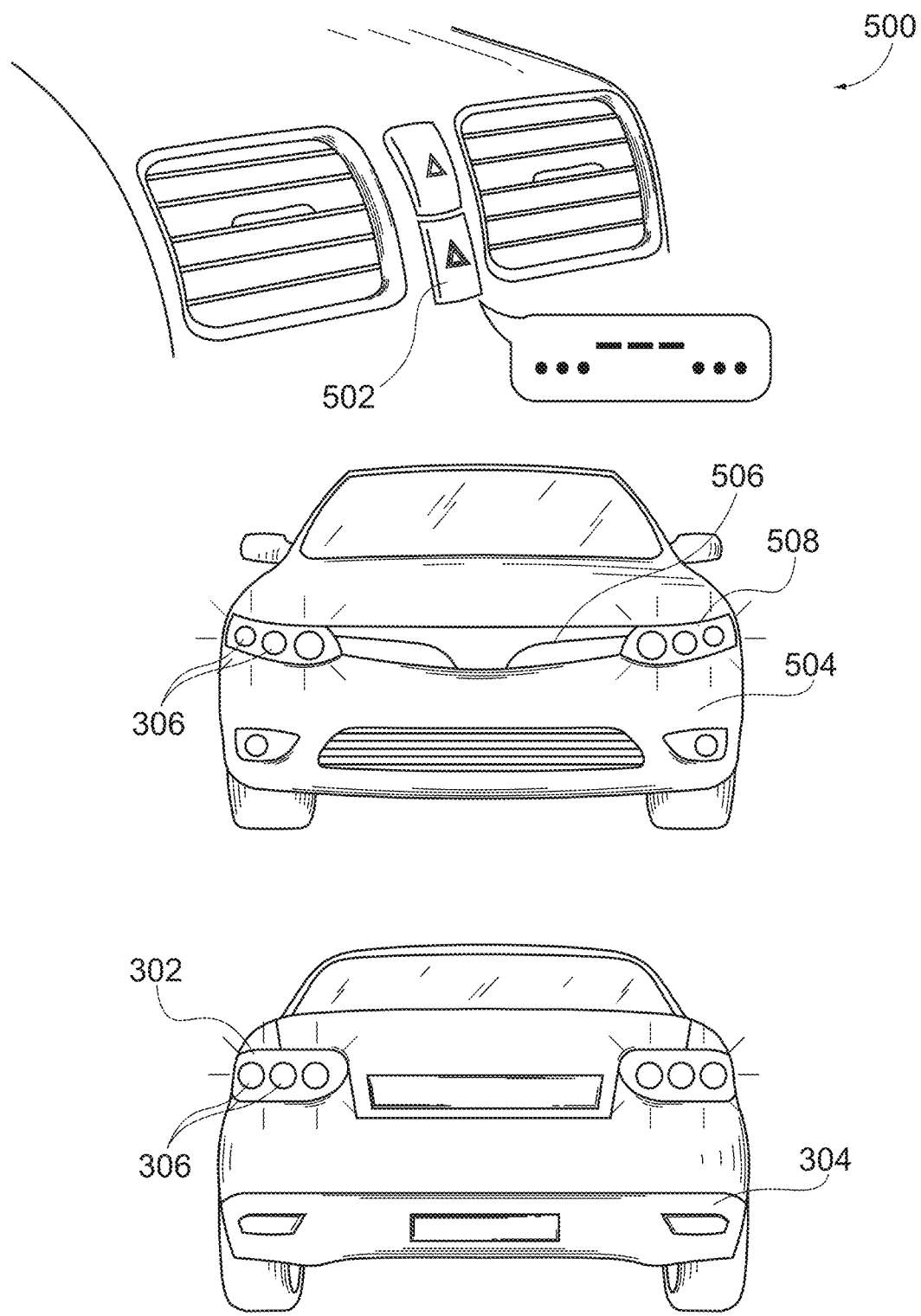
FIG. 5 illustrates alternative embodiments of orthogonal front and rear views of a vehicle, including turn signal controls.

In an illustrative configuration, a vehicle 100 may include additional features to enhance the functionality and visibility of the turn signal system. FIG. 5 illustrates a help request button 502 integrated into the turn signal system. The help request button 502 may be positioned near the turn signal controls, allowing a driver to easily activate it in conjunction with the turn signal lever 102. When activated, the help request button 502 may trigger the control unit to generate a distinct audible indicator, alerting nearby drivers of a potential emergency or need for assistance.

Figure 6:
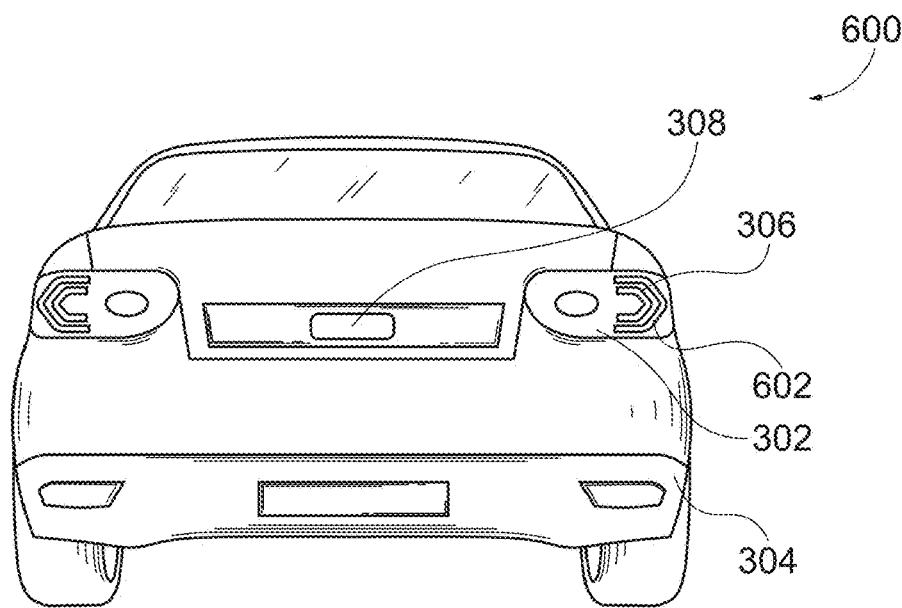
FIG. 6 illustrates a rear orthogonal view of a vehicle, focusing on tail light assemblies and turn signal indicators.

FIG. 6 illustrates a rear view of the vehicle 100, showcasing chevron indicators 602 integrated into the tail light assemblies 302. The chevron indicators 602 may be arranged in a sequential pattern, providing a clear visual indication of the intended direction and extent of a lane change maneuver. A rear bumper 304 extends across the lower portion of the vehicle 100, with a license plate area 308 centrally positioned between the tail light assemblies 302. The turn signal indicators 306 may be incorporated into the tail light assemblies 302, working in conjunction with the chevron indicators 602 to enhance visibility and communicate driver intentions.

In some cases, the control unit may activate the chevron indicators 602 in a flowing pattern from front to rear of the vehicle 100, creating a dynamic visual effect that draws attention to the vehicle's intended movement. This sequential lighting pattern may be particularly effective in low-light conditions or complex traffic scenarios where enhanced visibility is crucial.

Figure 7:
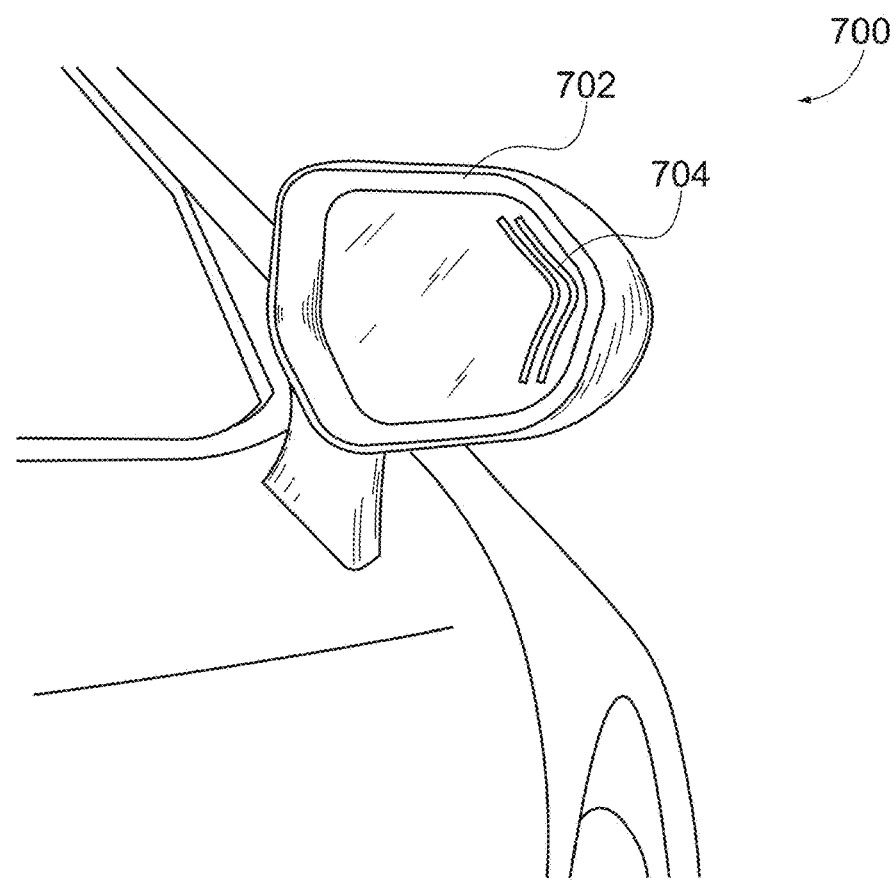
FIG. 7 illustrates an orthogonal side view of a vehicle side mirror assembly with integrated turn signal indicators.

FIG. 7 illustrates a side mirror assembly 702 of the vehicle 100, which may incorporate side chevron indicators 704. The side chevron indicators 704 may be integrated into the housing of the side mirror assembly 702, providing additional visibility from the sides of the vehicle 100. In an illustrative configuration, the side chevron indicators 704 may be activated in conjunction with the rear chevron indicators 602 and standard turn signal indicators 306, creating a comprehensive signaling system visible from multiple angles.

The control unit may be configured to activate different combinations of these visual indicators based on the position of the turn signal lever 102. For example, moving the turn signal lever 102 to a primary position may activate the standard turn signal indicators 306, while moving it to a secondary position may additionally activate the chevron indicators 602 and side chevron indicators 704. This multi-tiered approach allows for clear differentiation between single-lane and multi-lane change intentions.

In some cases, the vehicle 100 may include a display device visible to the vehicle operator. The control unit may present a visual confirmation on this display device, indicating the number of lane changes corresponding to the current position of the turn signal lever 102. This feature provides immediate feedback to the driver, ensuring they are aware of the signaling mode currently active.

The turn signal system may also incorporate haptic feedback mechanisms. For instance, the steering wheel 104 may include haptic elements that provide tactile feedback when the turn signal is activated, particularly for extended periods or when in a secondary signaling mode. This haptic feedback serves as an additional reminder to the driver of the active turn signal status.

In an illustrative configuration, the control unit may be programmed to generate specific signaling patterns for complex maneuvers or emergency situations. One such pattern may be a Save-Our-Soul (SOS) pattern, consisting of three short flashes, followed by three long flashes, and then three more short flashes. This universally recognized distress signal may be activated through a specific combination of inputs, such as rapidly toggling the turn signal lever 102 or pressing the help request button 502 in a particular sequence. In an illustrative configuration, an intentional slow-moving-vehicle may be provided with a signal pattern that clearly communicates this vehicle is moving intentionally slow and not in a hazardous condition indicated by the hazard flash sequence. Similarly, the signal pattern may be uniquely configured to indicate that the driver is in the process of, or needed assistance with, changing a flat tire.

The turn signal lever 102 may include detent mechanisms that provide distinct tactile feedback for each position. These detents may offer clear physical differentiation between the neutral, primary, and secondary positions, reducing the likelihood of accidental activation and ensuring the driver can confidently select the intended signaling mode without taking their eyes off the road.

Additionally, the vehicle 100 may be equipped with ground projection lights or underbody lighting strips. These lighting elements may be activated in conjunction with the turn signal system to provide enhanced visibility in low-light conditions. The ground projection lights may display directional arrows or other indicators on the road surface, further emphasizing the vehicle's intended path during lane changes or turns.

The comprehensive integration of these various visual, auditory, and haptic feedback mechanisms creates a robust turn signal system capable of clearly communicating driver intentions across a wide range of driving scenarios. By leveraging multiple sensory inputs, the system enhances overall road safety and improves communication between drivers in complex traffic environments.

Figure 8:
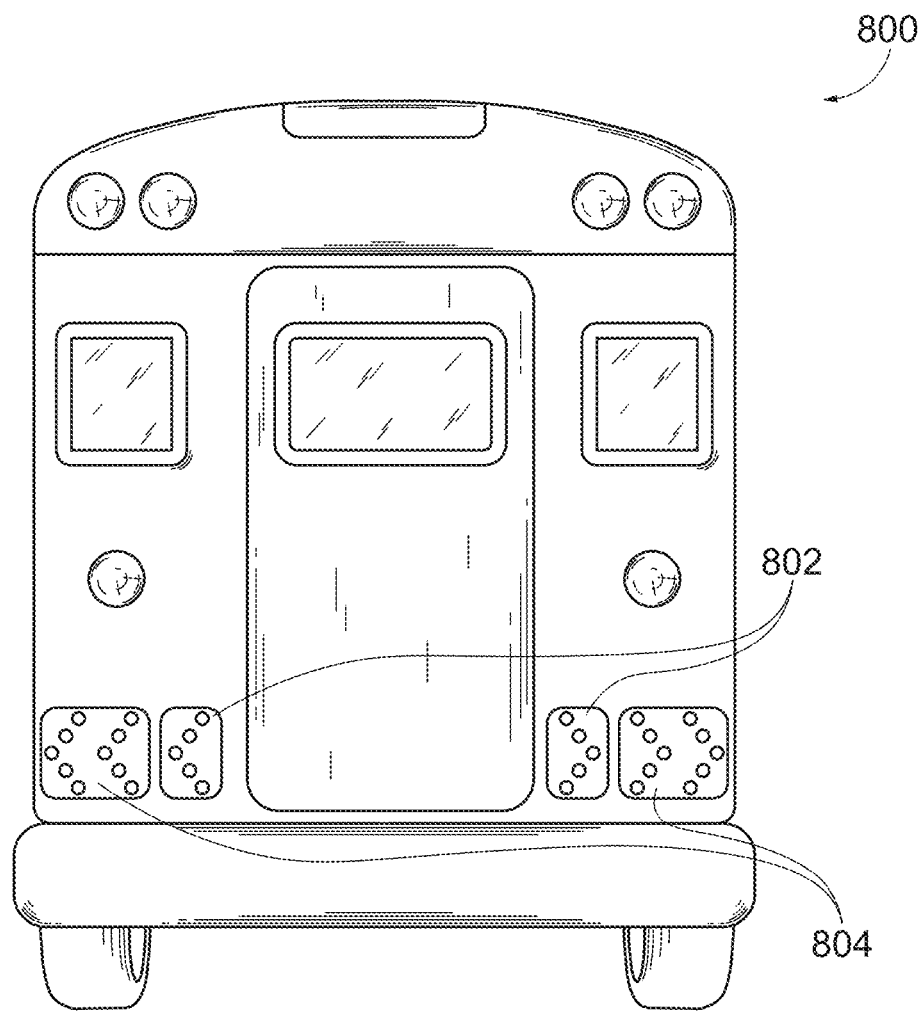
FIG. 8 illustrates an orthogonal rear view of a school bus with turn signal indicators for single and multiple lane changes.

In an illustrative configuration, the multi-position turn signal system may be adapted for use in a school bus 800. FIG. 8 illustrates a rear view of the school bus 800 equipped with a modified version of the turn signal system. The school bus 800 includes a single-lane indicator 802 and a multi-lane indicator 804 configured to communicate the driver's lane change intentions to surrounding vehicles.

With continued reference to FIG. 8, the single-lane indicator 802 may be activated when the turn signal lever is moved to the first left or first right signal position, indicating a standard single-lane change. The single-lane indicator 802 may utilize a conventional flashing pattern or a slightly modified pattern to enhance visibility for other drivers, particularly in school zones or areas with increased pedestrian activity. The multi-lane indicator 804 may be activated when the turn signal lever is moved to the second left or second right signal position, signaling the driver's intention to change multiple lanes. The multi-lane indicator 804 may employ a distinct flashing pattern or sequence to clearly differentiate it from the single-lane indicator 802. In some cases, the multi-lane indicator 804 may incorporate a sequential chevron pattern, with individual light elements illuminating in a directional sequence to emphasize the intended multi-lane movement. The school bus 800 application of the multi-position turn signal system may include additional safety features. For example, the control unit may be programmed to activate both the single-lane indicator 802 and the multi-lane indicator 804 simultaneously when the school bus 800 is stopping to load or unload passengers, providing an extra layer of visual warning to nearby vehicles. In some cases, the school bus 800 implementation may integrate with existing school bus safety systems, such as stop arm signals or overhead warning lights. The control unit may coordinate the activation of the turn signal indicators with these other safety features to create a comprehensive and highly visible signaling system for the school bus 800.

The adaptation of the multi-position turn signal system for the government and/or municipal service vehicles such as emergency medical services (EMS), police cars, fire trucks, or the representative school bus 800 demonstrates the versatility of the system for various vehicle types. The enhanced signaling capabilities may contribute to improved safety in school transportation by providing clearer communication of driver intentions during lane changes and other maneuvers.

In some cases, the turn signal system may incorporate lane-assist systems, blind spot monitoring sensors, and proximity sensors. These integrated sensors may provide input to the control unit, allowing for more sophisticated control of the turn signal indicators. The control unit may analyze data from these sensors to determine safe lane change conditions and adjust signaling accordingly.

In some configurations, the system may include sensors configured to detect lane markings. The control unit may use input from these sensors to automatically deactivate the turn signal indicators upon detecting that the vehicle has changed lanes a number of times corresponding to the signal position of the turn signal lever. This feature may help prevent unintended signaling after a lane change maneuver has been completed.

The system may generate feedback while the turn signal indicator is activated in certain patterns. This feedback may take various forms, including haptic, audible, or visual cues. For example, the system may produce a subtle vibration in the steering wheel, emit a distinct audio tone, and/or display a visual indicator on the dashboard to confirm the activation of a multi-lane change signal.

In some cases, the control unit may be programmed to override or modify driver input when sensors detect unsafe lane change conditions. For instance, if the blind spot monitoring system detects a vehicle in an adjacent lane, the control unit may delay or prevent the activation of a lane change signal until the adjacent lane is clear.

Adaptations for different vehicle types may also be implemented. For example, in larger vehicles such as buses or trucks, the system may be configured with additional or larger signal indicators to improve visibility. The control unit may also be programmed with different signaling patterns or durations to account for the unique maneuvering characteristics of these larger vehicles.

In an illustrative configuration, the system may utilize cameras to sense when lane changes have been completed. These cameras may work in conjunction with lane detection sensors to provide more accurate feedback to the control unit. The control unit may use this information to automatically cancel a multi-lane change signal once the intended number of lane changes has been executed.

As used herein, the term 'vehicle' is meant to include other configurations of roadway operated devices such as motorcycles, tricycles, scooters, etc. In one illustrative example, if the present disclosure is utilized on a motorcycle, the turn signal lever may be configured as a slide switch commonly used on the handlebars of a motorcycle. The present disclosure reads on various embodiments such as this configuration or others.

In an illustrative configuration, a vehicle signaling system may include: a turn signal lever movable between a neutral position and a plurality of actuated positions; a control unit coupled to the turn signal lever; and a display device visible to a vehicle operator; wherein the control unit is configured to: detect movement of the turn signal lever to one of the plurality of actuated positions; determine a number of lane changes indicated by the actuated position; and present, on the display device, a visual confirmation of the number of lane changes indicated.

In an illustrative configuration, a vehicle turn signal apparatus may include: a turn signal activation mechanism; a plurality of signal indicators positioned on an exterior of a vehicle; and a controller configured to: receive an input from the turn signal activation mechanism; determine whether the input indicates a single-lane change or a multi-lane change; and activate the plurality of signal indicators in a first pattern for a single-lane change or a second, distinct pattern for a multi-lane change.

In an illustrative configuration, a method of operating a vehicle turn signal may include: detecting actuation of a turn signal control; determining a degree of actuation of the turn signal control; selecting a turn signal pattern from a plurality of pre-defined patterns based on the determined degree of actuation; and activating one or more vehicle exterior lights according to the selected turn signal pattern.

The methods, systems, devices, graphs, and/or tables are illustrative examples, and configurations may omit, substitute, or add various procedures or components as appropriate. For instance, the methods may be reordered in alternative configurations, and/or various stages may be added, omitted, and/or combined. Alternatively, features described with respect to certain configurations may be in various alternative configurations. Different aspects and elements of the configurations may be combined similarly. Also, technology evolves; thus, many of the elements are examples and do not limit the scope of the disclosure or claims. Additionally, the techniques discussed herein may provide differing results with different types of context awareness classifiers.

Unless defined otherwise, all technical and scientific terms used herein have the same meaning as commonly or conventionally understood. As used herein, the articles "a" and "an" refer to one or more than one (i.e., to at least one) of the grammatical object of the article. By way of example, "an element" means one element or more than one element. "About" and/or "approximately" as used herein when referring to a measurable value such as an amount, a temporal duration, and the like encompass variations of ±20% or ±10%, ±5%, or ±0.1% from the specified value as such variations are appropriate in the context of the systems, devices, circuits, methods, and other implementations described herein. "Substantially," as used herein when referring to a measurable value such as an amount, a temporal duration, a physical attribute (such as frequency), and the like, also encompasses variations of ±20% or ±10%, ±5%, or ±0.1% from the specified value as such variations are appropriate in the context of the systems, devices, circuits, methods, and other implementations described herein.

As used herein, including in the claims, "and" as used in a list of items prefaced by "at least one of" or "one or more of" indicates that any combination of the listed items may be utilized. For example, a list of "at least one of A, B, and C" includes any of the combinations A, B, C, AB, AC, BC, and/or ABC (i.e., A, B, and C). Furthermore, to the extent more than one occurrence or use of the items A. B. or C is possible, multiple uses of A, B, and/or C may form part of the contemplated combinations. For example, a list of "at least one of A, B, and C" may include AA, AAB, AAA, BB, etc.

While illustrative and presently preferred embodiments of the disclosed systems, methods, and/or machine-readable media have been described in detail herein, it is to be understood that the inventive concepts may be otherwise variously embodied and employed and that the appended claims are intended to be construed to include such variations except as limited by the prior art. While the principles of the disclosure have been provided in connection with specific apparatuses and methods, it is to be clearly understood that this description is made only by way of example and not as a limitation on the scope of the disclosure.

What is claimed is:

1. A turn signal system for a vehicle, comprising:
   a turn signal lever movable between a neutral position and a plurality of signal positions;
   a control unit coupled to the turn signal lever;
   at least one turn signal indicator controlled by the control unit;
   wherein the plurality of signal positions comprises:
      a first left signal position and a second left signal position for indicating leftward vehicle movement; and
      a first right signal position and a second right signal position for indicating rightward vehicle movement;
   wherein the control unit is configured to:
      activate the at least one turn signal indicator in a first pattern when the turn signal lever is moved to the first left signal position or the first right signal position; and
      activate the at least one turn signal indicator in a second pattern different from the first pattern when the turn signal lever is moved to the second left signal position or the second right signal position; and
   a sensor configured to detect lane markings;
   wherein the control unit is further configured to deactivate the at least one turn signal indicator upon detecting that the vehicle has changed lanes a number of times corresponding to the signal position of the turn signal lever.

2. The turn signal system of claim 1, wherein the first pattern comprises a standard turn signal flash rate and the second pattern comprises a faster flash rate than the standard turn signal flash rate.

3. The turn signal system of claim 1, wherein the control unit is further configured to:
   activate an audible indicator when the turn signal lever is moved to the second left signal position or the second right signal position.

4. The turn signal system of claim 1, wherein the at least one turn signal indicator comprises:
   a first set of turn signal lamps activated by the first pattern; and
   a second set of turn signal lamps activated by the second pattern.

5. The turn signal system of claim 4, wherein the second set of turn signal lamps comprises lamps integrated into side mirrors of the vehicle.

6. The turn signal system of claim 1, wherein the control unit is further configured to:
   generate a feedback while the at least one turn signal indicator is activated in the second pattern.

7. The turn signal system of claim 6, wherein the feedback is at least one of: a haptic feedback, an audible feedback, and a visual feedback.

8. A method of operating a turn signal system for a vehicle, the method comprising:
   moving a turn signal lever between a neutral position and a plurality of signal positions, wherein the plurality of signal positions comprises a first left signal position, a second left signal position, a first right signal position, and a second right signal position;
   activating, by a control unit, at least one turn signal indicator in a first pattern when the turn signal lever is moved to the first left signal position or the first right signal position;
   activating, by the control unit, the at least one turn signal indicator in a second pattern different from the first pattern when the turn signal lever is moved to the second left signal position or the second right signal position;

detecting actuation of a turn signal control to a first position;

activating a first set of exterior vehicle lights in a standard turn signal pattern;

detecting further actuation of the turn signal control to a second position; and activating a second set of exterior vehicle lights in addition to the first set, wherein the second set of lights provides a visual indication of an intended multi-lane change maneuver.

9. The method of claim 8, wherein:

the first pattern comprises a standard turn signal flash rate;

the second pattern comprises a faster flash rate than the standard turn signal flash rate; and the method further comprises activating an audible indicator when the turn signal lever is moved to the second left signal position or the second right signal position.

10. The method of claim 8, wherein:

activating the at least one turn signal indicator in the first pattern comprises activating a first set of turn signal lamps;

activating the at least one turn signal indicator in the second pattern comprises activating a second set of turn signal lamps; and the second set of turn signal lamps comprises lamps integrated into side mirrors of the vehicle.

11. The method of claim 8, further comprising:

detecting lane markings using a sensor;

deactivating the at least one turn signal indicator upon detecting that the vehicle has changed lanes a number of times corresponding to the signal position of the turn signal lever; and generating a feedback while the at least one turn signal indicator is activated in the second pattern, wherein the feedback is at least one of: a haptic feedback, an audible feedback, and a visual feedback.

12. A vehicle turn signal system comprising:

a turn signal control mechanism;

a plurality of light-emitting elements arranged in a chevron pattern on an exterior surface of the vehicle;

a control unit configured to:

receive an input from the turn signal control mechanism; and activate the plurality of light-emitting elements in a sequential pattern to display a moving chevron indicator in response to the input; and a sensor configured to detect lane markings;

wherein the control unit is further configured to deactivate at least one of the plurality of light-emitting elements upon detecting that the vehicle has changed lanes a number of times corresponding to the input from the turn signal control mechanism.

* * * * *